2,104,320

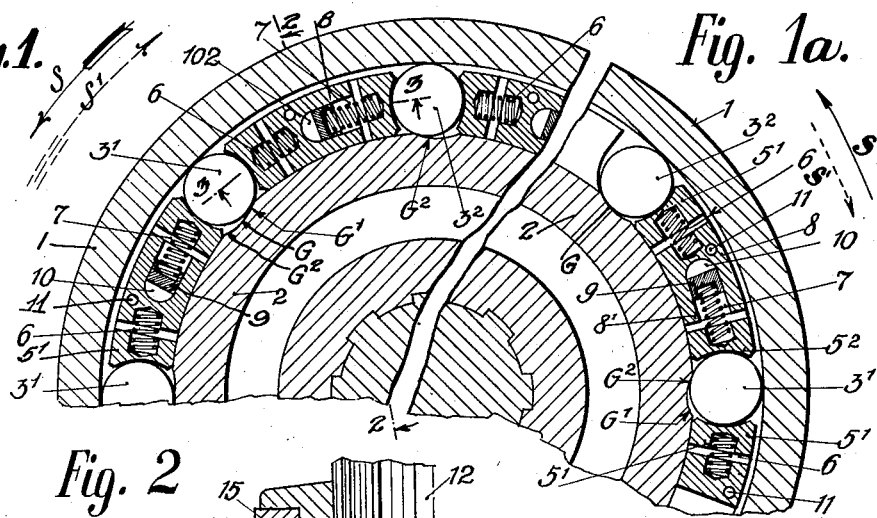
Jan. 4, 1938. S. FISCHER 2,104,320
FREEWHEELING CLUTCH
Filed May 13, 1936 2 Sheets-Sheet 1
INVENTOR
STEFAN FISCHER
BY Walter S. Bleistein
ATTORNEY Jan. 4, 1938.  S. FISCHER  2,104,320
FREEWHEELING CLUTCH
Filed May 13, 1936  2 Sheets-Sheet 2
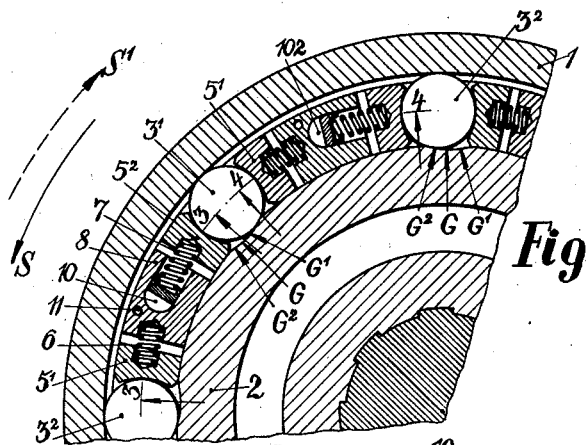
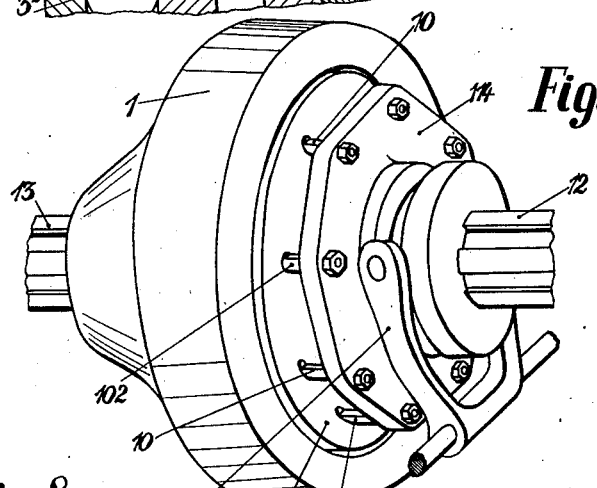
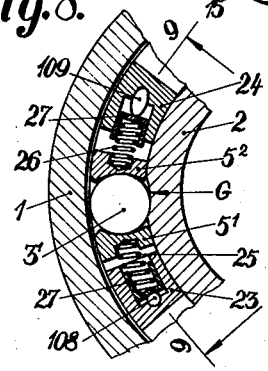
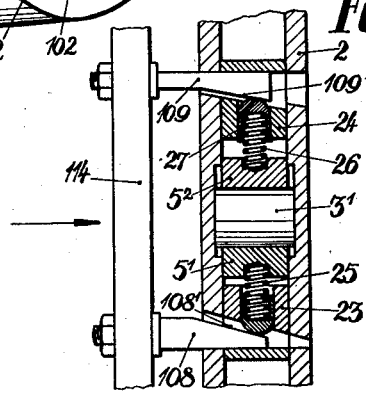
INVENTOR
STEFAN FISCHER
BY Walter S. Bleistein
ATTORNEY Patented Jan. 4, 1938

UNITED STATES PATENT OFFICE 2,104,320

FREEWHEELING CLUTCH

Stefan Fischer, Prague, Czechoslovakia

Application May 13, 1936, Serial No. 79,450
In Czechoslovakia May 18, 1935

18 Claims. (Cl. 192—44)

My invention relates to a free-wheeling clutch permitting free-wheeling and clutching in both directions of rotation.

An object of the invention is the provision of a clutch of the said type which may be so adjusted also during the operation, by means of simple shifting elements, that it may act as a free-wheeling device either in one main direction of rotation, or in the opposite direction, or that it may establish a solid clutch in both directions.

A further object of the invention is the provision of means for making the engagement or disengagement compulsory, elastic and free of shocks, thereby reducing the noise and the wear of the engaging clutch parts to a minimum.

A clutch according to my invention comprises a driving and a driven part one of which is provided with cam surfaces inclined with respect to the circumferential direction of the clutch. Such cam surfaces may run out symmetrically in relation to radial planes of the clutch. Jamming members, such as rollers, balls or the like are shiftable on the cam surfaces by means of adjustable members and resilient elements like springs.

The essence of the invention consists in the fact that the resilient elements provided at both sides of a jamming member are arranged to compulsorily act upon the jamming member in all shifting positions, with or without the help of transmission members placed therebetween, whereby free-wheeling may be obtained in either the one or the other one circumferential direction. The clutch may be locked by resiliently shifting neighboring jamming members on their cam surfaces towards or away from each other until jamming is effected between the driving and the driven clutch parts.

According to the invention, movable supports are provided for the jamming members, and the inclined surfaces of a number of these supports may have a constant inclination, while the surfaces of the remaining supports may have a varying inclination whereby different lengths of way of the jamming members may be obtained through a simultaneous turning or shifting of the movable supports in the same direction. Thus, at a certain extent of the shifting or turning of the movable supports, a jamming member may remain in its jamming position for free-wheeling in one direction of rotation of the clutch, while simultaneously the neighboring jamming member is shifted from such jamming position into the jamming position for free-wheeling in the opposite direction, whereby the clutch will be locked.

At a further simultaneous shifting of the movable supports, however, also the first mentioned jamming member will be moved from its jamming position beyond its center position into the position for the opposite direction of rotation of the clutch whereby free-wheeling in such opposite direction is obtained.

According to a further feature of the invention, only some of the jamming members may be provided with the aforementioned arrangement, while resilient elements arranged at one side only in a manner well known per se, may act upon the other jamming members. In this case, the clutch may be used as a free-wheeling mechanism in one direction, and may also be locked.

In the accompanying drawing, examples of embodiments of my invention are illustrated.

Fig. 1 is a free-wheeling clutch according to the invention in section along line 1—1 of Fig. 2.

Fig. 1a is a modification of the clutch illustrated in Fig. 1.

Fig. 2 is a view in section along line 2—2 of Fig. 1.

Fig. 3 is a section along a cylindrical surface in the direction 3—3 of Figs. 1 and 7.

Fig. 4 is a similar view of another embodiment of the movable support in the direction 4—4 of Fig. 7.

Fig. 5 shows the arrangement of radial wedges as movable supports in a section at right angles to the clutch axis.

Fig. 6 is an axial section of the embodiment of Fig. 5.

Fig. 7 is another embodiment of a free-wheeling clutch in section at right angles to the axis of rotation.

Fig. 8 is a partial section of another embodiment with wedges at both sides of the jamming member.

Fig. 9 is a section along the cylindrical surface in the direction 9—9 of Fig. 8.

Fig. 10 shows the arrangement of radially journaled, rotatable cams as movable supports.

Fig. 11 is an elevation, partly in section, of the cam and the shifting rod as shown in Fig. 10, and Fig. 12 is a perspective view of the free-wheeling clutch of Fig. 7.

In the embodiment illustrated in Fig. 1, the jamming member $3^1$, in the present case a roller, rests on the cam surface G of the driven clutch part 2. The cam surface consists of two portions $G^1$ and $G^2$ which may run out symmetrically at both sides of a radial plane of the clutch. Pressure members $5^1$, $5^2$ and abutment members 8 are arranged in a dove-tailed ring groove $2^1$ of the clutch part 2. The abutment members 8 are rigidly connected to the clutch part 2 by means of pins 11. They are provided each with a bore extending in circumferential direction and housing one end of a spring 6. The other end of each spring 6 bears against one of the pressure members $5^1$ which are easily shiftable in the ring groove $2^1$. The pressure members $5^1$ bear against the roller $3^1$. A similar pressure member $5^2$ engages the opposite side of the roller $3^1$ and is subjected to the action of a spring 7 resting upon the spring cup 9 which is guided in the bore of the member 8. This spring cup bears with a rounded surface upon a wedge surface $10^1$ of pin 10 (see Fig. 3) which is guided in a bore provided in the member 8 and in the clutch part 2, and is arranged parallel to the axis of rotation of the clutch. This wedge 10 is connected to a flanged sleeve 14 (see Fig. 2) which is shiftable in axial direction on the splined driven shaft 12 in such a manner that the position of wedge 10 may be altered in axial direction by means of a fork 15, and consequently the tension of spring 7 may be increased more or less by a shifting of the wedge surface $10^1$.

If the wedge 10 is so positioned that the tension of spring 7 causes the jamming member $3^1$ to rest at the deepest point of the surface G, no jamming engagement will occur between the roller and both clutch parts 1 and 2, that means the clutch will be disengaged provided all rollers have wedges of the same structure, since the distance of the said deepest point from the inner surface of the driving clutch part 1 is larger than the diameter of the roller $3^1$.

If, now, the wedge 10 is shifted in a direction opposite to that of the arrow in Fig. 3, the tension of spring 7 will be released and roller $3^1$ will be shifted to the cam surface $G^2$ by the action of spring 6, whereby this roller approaches the inner surface of the driving clutch part. Spring 7 serves as a resilient counter-support, and, consequently, roller $3^1$ will be elastically brought into the jamming position between the clutch parts 1 and 2 upon a further shifting of the wedge 10. If, in this case, the driving clutch part 1 rotates in the direction of the arrow S, the jamming engagement is maintained as long as the driving part tends to overrun the driven part 2. If, however, the driving part 1 is decelerated, as for instance when the motor throttle of a vehicle is closed to which the device is applied, then, the jamming action will be removed and the clutch operates as a free-wheeling mechanism. In certain instances, e. g. during the shifting of the transmission of a motor vehicle, it is desirable to prevent the possibility of a jamming engagement of rollers $3^1$. This may be accomplished by pushing wedge 10 into the clutch by means of fork 15 and sleeve 14. Thereby spring 7 is tensioned, and the jamming member is elastically removed from its jamming engagement with clutch parts 1 and 2. Thereby, the jamming member takes such a position that no jamming action can occur when the driven part overruns the driving part.

It has been found that the jamming of roller $3^1$ in clutches of this type is only possible due to a small deformation of the roller. During its removal from the jamming position an amount of work has to be delivered by spring 7, equivalent to such deformation and causing a tendency of the roller to jump out of its jamming position. This, however, is elastically dampened by spring 6.

If wedge 10 is shifted still farther into the clutch in the direction of the arrow in Fig. 3, then the roller is moved to the cam surface $G^1$ by a further compression of spring 7, and is brought into the jamming position with the clutch parts 1 and 2 upon a corresponding shifting of the wedge 10. In this case, the driven part 2 is taken along when the driving clutch part 1 rotates in the direction of arrow $S^1$. If the driving part 1 lags behind, the clutch acts as a free-wheeling device for this direction of rotation.

Means may be provided for locking the freewheeling mechanism of my invention. In the embodiment shown in Fig. 1a, there is a set of rollers $3^1$ with accessorial parts, the same as in Fig. 1. In addition thereto, a second set of rollers $3^2$ is provided. Rollers $3^2$ are under the one-sided action of springs 6 which bear against abutment members 8 connected to parts 2. No springs bear against the opposite sides of these rollers. Due to this arrangement the rollers $3^2$ are always so kept on the cam surfaces $G^2$ that they constantly engage the inner cylindrical surface of the driving part. Consequently a jamming of the rollers $3^2$ occurs between the clutch parts 1 and 2 when the driving part 1 overruns the driven part 2, and the driven part 2 will be taken along. Rollers $3^1$ are provided with the wedge arrangement described above, these rollers being jammed in the direction of the arrow S. If sleeve 14 is shifted towards the driven part, that means if the wedges are shifted into the clutch, springs 7 become so tensioned that the rollers $3^1$ are moved down the cam surfaces $G^2$ and then up the cam surfaces $G^1$ until they contact the inner cylindrical surface of part 1 whereby a jamming of these rollers takes place between both clutch parts 1 and 2 in the direction of the arrow $S^1$. If, now, the driven part 2 tends to overrun part 1, or the latter tends to lag behind the driven part 2, then, the jammed rollers $3^1$ will prevent this, and consequently, rollers $3^2$ will not leave their jamming position. Thus, the freewheeling is locked. In order to disengage this lock, sleeve 14 with the wedges 10 is to be moved away from clutch part 2, releasing the tension of springs 7, whereby rollers $3^1$ are moved out of the jamming position on cam surfaces $G^1$ through the tension of the springs 6. Upon a further shifting of the wedges 10 in a direction opposite to that of the arrow in Fig. 3, they are pushed along cam surfaces $G^2$ as far as the jamming position between clutch parts 1 and 2. Then, the clutch acts again as a free-wheeling mechanism in the direction of rotation of arrow S.

The wedges for altering the tension of the springs may also be arranged in any other suitable manner, for instance radially, as illustrated in Figs. 5 and 6. In these figures the driven clutch part 21 is fastened by a key upon the hollow shaft 16 while the driving part 1 connected for instance with the gear wheel 22 and being driven by the latter, may freely rotate with bushing 17 on the said shaft. The wedges 101 are radially arranged and guided in part 21. They are pressed, by means of springs 18, against a cone 19 which is axially shiftable within the hollow shaft in the direction of the arrows. If cone 19 is shifted, wedges 101 are more or less raised, and consequently, springs 7 become more or less tensioned.

In order to use the clutch with free-wheeling also for the opposite direction of rotation rollers $3^2$ are provided with a wedge device of a similar kind as rollers $3^1$. This is shown in Fig. 7. In order, however, to avoid the application of a second sleeve, the wedges 102 for rollers 3² may be provided with a varying slope (see Fig. 4), and may be connected to sleeve 114 (see Fig. 12). If wedges 10 and 102 are retracted from the clutch so far that the spring cups 9 just bear against the ends of the active surfaces of these wedges, a free-wheeling is possible in the direction of rotation S of the clutch. If the wedges 10 and 102 are shifted into the clutch for instance half the way of the sleeve, the clutch is locked in the direction of rotation S as well as in the direction S¹. In this position, free-wheeling is impossible, because rollers 3¹ are moved, under the action of wedges 10, into the right hand jamming position for the direction of rotation S¹ while rollers 3² influenced by wedges 102 are still in their left hand jamming position for the direction of rotation S. The correct inclinations of the wedge surfaces having the indicated effect can be easily determined by figuring or trying. The pertaining position of the rollers 3¹, 3² and of the wedges 10, 102 is illustrated in Fig. 7 and in Figs. 3 and 4. The locking is caused by the fact that a surface of wedge 102, parallel to the bore guiding this wedge will not effect an alteration of the tension of the spring 7 at the rollers 3². Consequently, rollers 3² remain jammed in the direction of arrow S while the springs 7 at the rollers 3¹ are compressed by the wedge surfaces of the wedges 10 being shifted in the direction of the arrow of Fig. 3, and thus push the rollers 3¹ in the direction of the arrow S¹ causing a jamming also in this direction. In this position the clutch is locked.

If the wedges 10 and 102 are still farther pushed into the clutch, also the springs 7 at the rollers 3² will be compressed whereby these rollers too will be urged in the direction of arrow S¹ until they are jammed between the rotating parts 1 and 2. In this position of the clutch parts, free-wheeling is possible also at a rotation of the clutch in the direction of arrow S¹.

As stated above, wedges 10 are so shaped that they push the associated rollers 3¹ into engagement with cam surfaces G¹ when the sleeve 114 is in the half-way position. Only a slight spring pressure is required for holding the rollers 3¹ on cam surfaces G¹, because practically no relative movement of parts 1 and 2 can occur when the clutch is in the locked position. The taper of wedges 10 is so continued towards their upper ends near sleeve 114 that the thicknesses of the active portions of both wedges 10 and 102 are substantially equal in the pushed-in position of the sleeve, and, consequently, equal pressures or jamming forces are applied to both sets of rollers 3¹ and 3². This has for a result that in the last mentioned position all rollers equally participate in the transmission of the torque between parts 1 and 2. If contrary thereto, the upper end portions of wedges 10 and 102 differ in thickness, it might happen that only the rollers being under higher spring pressure than the other ones take up the occurring shocks and get overstrained when the overrunning part is suddenly driven by the hitherto trailing part. In view of such possibility, the illustrated structure of the wedges 10 is preferred.

With certain types of these clutches, it is advantageous to cause shiftable supports, for instance wedges, to act upon the respective springs at both sides of the jamming members, as illustrated in Figs. 8 and 9. In these figures wedges 108 and 109 are connected to a sleeve 114. Springs 25 and 26 with pressure members 5¹ and 5² respectively are provided similarly to springs 6 and 7 of Fig. 7. Both springs have spring cups 27 in engagement with wedges 108 and 109 respectively, and the wedges are guided in pressure members 23 and 24, substantially in the same manner as for instance wedge 10 of Fig. 7 is guided in member 8. In this case, the wedge 108 acting upon the spring 25 may have a wedge surface either parallel or slightly aslant to the wedging surface of the wedge 109 acting upon the spring 26.

Instead of the wedges, other suitable means for instance rotatable cams may be used as illustrated in Figs. 10 and 11. A cam 103 is rigidly mounted on a shaft 104 which is journaled in the driven part 2. The axis of shaft 104 is arranged in a plane at right angles to the axis of the driving shaft, and tangential with respect to a certain circle. The diameter of this circle is defined by the diameter of a shifting rod 106 which is shiftable in the hollow shaft 107. Rod 106 is provided with teeth formed by ring grooves cut into the rod. These teeth are engaged by the teeth of a small pinion 105 fastened to the interior end of shaft 104 which carries the cam 103. Rotation of the clutch does not influence the cam as long as the rod 106 is in a fixed relation to the shaft 107 in axial direction. If, however, rod 106 is axially shifted in the bore of the shaft 107, then shaft 104 and consequently also cam 103 are turned due to the engagement of pinion 105. The movement increases or decreases, as the case may be, the tension of the springs 6 and 7 whereby roller 3¹ will be shifted towards or away from the cam.

The individual parts of the clutch and their relative positions may be made and arranged in various ways without departing from the essence of the invention.

The free-wheeling clutch according to my invention operates as follows: The clutch illustrated in Figs. 1, 2 and 3 is disengaged when each wedge 10 is brought into such a position that the tension of spring 7 counteracting the respective spring 6 has shifted roller 3¹ so as to rest at the deepest point of cam surface G. No jamming action occurs in this position, and, consequently, no torque is transmitted from the driving part 1 to the driven part 2. In order to engage the clutch, sleeve 14, by means of fork 15, must be moved in a direction opposite to that of the arrow in Fig. 3. Thereby, the tension of spring 7 is lessened so much so that spring 6 causes roller 3¹ to climb cam surface G² and, simultaneously, to contact the inner surface of driving part 1. The friction occurring due to the rotation of part 1 in the direction of arrow S, jams roller 3¹ in between its surfaces of contact whereupon driven part 2 will be taken along by part 1.

If, now, part 2 overruns part 1, the friction force between the roller 3¹ and part 1 changes its direction and assists the tension of spring 7 to overcome the jamming force and the tension of spring 6, and to shift roller 3¹ back towards the deepest point of cam surface G. As soon as the roller has left its jamming position, the said friction has only to overcome the difference in the tension of both springs. Consequently, no material transmission of a torque from part 2 to part 1 takes place, i. e. the clutch is in its free-wheeling position. However, as soon as part 1 tends again to overrun part 2, roller 3¹ will be returned to its jamming position as described.

In order to disengage the clutch, while a certain torque is being transmitted from part 1 to part 2, wedge 10 must be shifted inwards in the direction of the arrow in Fig. 3, until the tension of spring 7 is sufficient to overcome the jamming force and the tension of spring 6. As soon as roller 3¹ under this action of wedge 10 and spring 7 has left its jamming position, the wedge may be returned to its original idling position whereby roller 3¹ is kept at the deepest point of cam surface G.

When the direction of rotation of the driving part 1 is reversed, i. e. if part 1 rotates in the sense of arrow S¹ in Fig. 1, the clutch can be engaged by shifting wedge 10 out of its idling position in the direction of the arrow in Fig. 3. This causes roller 3¹ to engage cam surface G¹ and to get jammed between the latter and part 1. Free-wheeling will occur as soon as part 2 overruns part 1, and the clutch may be disengaged by spring 6 shifting the roller back when wedge 10 is moved so as to release the tension of spring 7.

With regard to the device illustrated in Fig. 1a, at first rotation of the driving part 1 in the direction of arrow S¹ will be contemplated. Starting from the position of wedge 10 in Fig. 3, rollers 3¹ are kept at the deepest points of their associated cam surfaces G. Consequently, no torque will be transmitted through these rollers, and the clutch is idling because rollers 3² will be forced down their associated cam surfaces G² against the tension of their springs 6 by friction with part 1. When part 2 overruns driving part 1, coupling is effected through rollers 3² returning to their jamming position under the action of their associated springs 6. Shifting of wedges 10 in a direction opposite to that of the arrow in Fig. 3 does not materially alter the operation of the clutch except that rollers 3¹ are brought into the same position as rollers 3², and, thus, assist the latter in transmitting the torque when part 2 overruns part 1. If, however, wedges 10 are shifted in the direction of the arrow in Fig. 3, rollers 3¹ are caused to climb their cam surfaces G¹, and are jammed in between clutch parts 1 and 2 so as to couple these parts for rotation. In this position, no free-wheeling is possible in as much as rollers 3² prevent part 2 from overrunning part 1.

If driving part 1 rotates in the direction of arrow S, coupling of parts 1 and 2 is constantly maintained by rollers 3² except when part 2 overruns part 1. With wedges 10 in a middle position, rollers 3¹ are idling. With wedges 10 in their outward position, rollers 3¹ assist rollers 3², and with wedges 10 in their inward position rollers 3¹ prevent free-wheeling when part 2 tends to overrun part 1.

In order to explain the operation of the device illustrated in Fig. 7, be it assumed that the driving part 1 rotates in the direction of arrow S and that wedges 10 and 102 are shifted to their outermost position. Then, rollers 3¹ and 3² will be urged by their springs 6 towards cam surfaces G², thereby accomplishing engagement of the clutching elements so that part 2 will be taken along by part 1. Free-wheeling is possible, i. e. part 2 may overrun part 1. If now the wedges are pushed inward to the position of Figs. 3 and 4, rollers 3² remain in their original position because spring cups 9 of their springs 7 are not yet in contact with the slopes of wedges 102. Contrary thereto, springs 7 of rollers 3¹ have been tensioned by wedges 10 so much so that these rollers are on their associated cam surfaces G¹ (see Fig. 7) and prevent free-wheeling if part 2 tends to overrun part 1. When the wedges are shifted still more inward, rollers 3² are also caused to climb their cam surfaces G¹. In this position the clutch is disengaged for a rotation of driving part 1 in the direction of arrow S because the friction between the rollers and part 1 returns the former towards the deepest points of their cam surfaces G against the force of springs 7.

If now without changing the last mentioned position of the wedges, part 1 is reversed to rotate in the direction of arrow S¹, the clutch is in its engaged position because part 2 is taken along by the jammed rollers. Free-wheeling, however, is possible because part 2 can overrun part 1. When the wedges are retracted to their intermediate position, rollers 3² will tend to climb their cam surfaces G² before rollers 3¹ have left their cam surfaces G¹ due to the difference in the inclinations of the respective wedge surfaces. Consequently, part 1 continues to drive part 2. Free-wheeling, however, is impossible because rollers 3² are in their jamming position if part 2 tends to overrun part 1. In the outermost position, finally, the clutch is adapted for free-wheeling in one direction because no torque can be transmitted from the driving part 1 to part 2.

The free-wheeling clutch according to the invention is of a simple construction and is composed of parts which may be manufactured very accurately. It permits an easily operable locking of the free-wheeling by means of resilient elements, without friction and shocks, even at great differences of the revolutions of the clutch parts. Consequently, the wear of the locking parts is decreased to a minimum. The clutch according to the present invention furthermore permits the use of the free-wheeling as well as the locking of the free-wheeling mechanism in both directions of rotation of the clutch.

I claim:—

1. A free-wheeling clutch comprising a driving part and a driven part in coaxial arrangement, at least one jamming member between said parts, said jamming member having a free position and one jamming position in front and one jamming position behind its free position in the direction of rotation, a first resilient means arranged in front and a second resilient means arranged in the rear of said jamming member whereby said resilient means counteract each other, and each resilient means tends to urge said jamming member into one of its jamming positions respectively, a supporting member having a supporting surface for one of said resilient means, said supporting member being connected for rotation with one of said parts but movable relatively thereto, the other resilient means being supported by said last mentioned part, and means for moving said supporting member from the outside relatively to said last mentioned part whereby the tension of said resilient means supported by said supporting member may be altered upon a movement of said supporting member.

2. A free-wheeling clutch as claimed in claim 1 furthermore comprising at least one second jamming member between said parts, said second jamming member having a free position and a jamming position, and a third resilient means supported by said part to which said supporting member is connected for rotation, said third resilient means so arranged as to tend to urge said second jamming member into its jamming position.

3. A free-wheeling clutch comprising a driving part and a driven part in coaxial arrangement, a first set of jamming members and a second set of jamming members between said parts, each of said jamming members having a free position and one jamming position in front and one jamming position behind said free position in the direction of rotation, a first set of resilient means, and a second set of resilient means, one resilient means of each set being arranged in front and in the rear respectively, of each jamming member, and tending to urge the associated jamming member into one of its jamming positions respectively, a first set of externally controlled means for altering the tension of the first resilient means of the first set of jamming members, and a second set of externally controlled means for altering the tension of the first resilient means of the second set of jamming members.

4. A free-wheeling clutch comprising a driving part, a driven part in coaxial arrangement with said driving part, at least one jamming member between said parts, one of said parts having a depressed cam surface on which said jamming member is adapted to move, said cam surface running out towards both sides in circumferential direction in such a manner that the distance of its deepest point from said other part is larger, and the distance near the ends of said cam surface from said other part is smaller than the dimension of said jamming member between said parts, a first resilient means supported by said part with said cam surface, and tending to urge said jamming member towards one end of said cam surface, a movable means supported by said last mentioned part, and a second resilient means supported by said movable means and tending to urge said jamming member towards the other end of said cam surface, said movable means being so constructed and arranged as to increase compression of said second resilient means when moved in one direction, and to decrease compression of said resilient means when moved in the other direction.

5. A free-wheeling clutch as claimed in claim 4 having at least one second jamming member and a second depressed cam surface on said part with said first cam surface, and a third resilient means supported by said last mentioned part, and tending to urge said second jamming member in the same direction as said first resilient means urges said first jamming member.

6. A free-wheeling clutch comprising a driving part, a driven part in coaxial arrangement with said driving part, a first set of jamming members and a second set of jamming members between said parts, one of said parts having depressed cam surfaces, one for each jamming member, each of said cam surfaces running out towards both sides in circumferential direction in such a manner that the distance of its deepest point from said other part is larger, and the distance near the ends of the cam surface from said other part is smaller than the dimension of the associated jamming member between said parts, a set of first resilient means, one for each jamming member, each first resilient means being supported by said part with said cam surfaces, and tending to urge its associated jamming member in one direction of rotation, a first set of movable means, each associated with one of the first set of jamming members, a second set of movable means each associated with one of the second set of jamming members, said movable means being supported by said last mentioned part, a set of second resilient means, one for each jamming member, each of said second resilient means being supported by one of said movable means, and tending to urge its associated jamming member in the other direction of rotation, said first set of movable means being so constructed and arranged as to alter the tension of said second resilient means of said first set of jamming members, and said second set of movable means being so constructed and arranged as to alter the tension of said second resilient means of said second set of jamming members.

7. In a free-wheeling mechanism having a driving part and a driven part in coaxial arrangement, the combination of a jamming member movable between said parts on a depressed cam surface of one of said parts, with a first spring so arranged as to act upon said jamming member and to react upon said last mentioned part, whereby said spring tends to move said jamming member into a jamming position between one end of said cam surface and said other part, a supporting member connected for rotation with said part provided with said cam surface, and being movable relatively thereto, and a second spring arranged between said supporting member and said jamming member on the side of the latter opposite to the first spring whereby said second spring tends to urge said jamming member into a jamming position between the other end of said cam surface and said other part, said supporting member being so shaped as to alter the tension of said second spring when being moved relatively to the part provided with said cam surface.

8. In a free-wheeling mechanism having a driving part and a driven part in coaxial arrangement the combination of a jamming member movable between said parts on a depressed cam surface of one of said parts, said jamming member being in a free position when in the middle portion of said cam surface and being in a jamming position between said parts when near the ends of said cam surface, with a first spring so arranged between said jamming member and said part provided with said cam surface as to tend to move said jamming member towards one end of said cam surface, a wedge movable at right angles to the plane of rotation of said mechanism and connected for rotation with said last mentioned part, and a second spring between said wedge and said jamming member on the side of the latter opposite to said first spring, said second spring tending to move said jamming member towards the other end of said cam surface, whereby the tension of said second spring will be altered when said wedge is moved relatively to said last mentioned part.

9. A mechanism as claimed in claim 8 in which a sleeve is provided connected for rotation with said part having said cam surface, said sleeve being axially movable in relation to said last mentioned part, and said wedge being attached to said sleeve.

10. A mechanism as claimed in claim 7 in which said supporting member is arranged radially within said part having said cam surface, and in which an axially shiftable cone is provided in the center of said last mentioned part, one end of said supporting member being adapted to engage said cone, the other end of said supporting member being wedge shaped, and said second spring being supported by said wedge shaped end of said supporting member.

11. A mechanism as claimed in claim 7 in which said supporting member is formed as a cam, furthermore comprising a shaft journaled within said part provided with said cam surface, said cam being mounted on said shaft, and means for rotating said shaft independent of the rotation of said mechanism.

12. A mechanism as claimed in claim 7 in which said supporting member is formed as a cam, furthermore comprising a shaft journaled within said part provided with said cam surface, the axis of said shaft being arranged in the plane of rotation of said last mentioned part, a gear wheel mounted on the inner end of said shaft, an axially movable shifting rod in coaxial arrangement with said last mentioned part, said rod being provided with ring grooves, said gear wheel engaging said grooves, and said second spring being supported by said cam.

13. A free-wheeling mechanism comprising a driving part and a driven part in coaxial arrangement, a first set of jamming members and a second set of jamming members between said parts, one of said parts having depressed cam surfaces one for each jamming member, a set of first springs, one for each jamming member, each first spring being supported by said last mentioned part, and tending to urge its associated jamming member in one direction of rotation into a jamming position at one end of its associated cam surface, a set of supporting means connected for rotation with said last mentioned part but movable in relation thereto, a set of second springs, one of said supporting means and one of said second springs for each jamming member of said first set of jamming members, each of said second springs being arranged between the associated jamming member on the side of the latter opposite to the associated first spring, and tending to urge its associated jamming member in the opposite direction of rotation into a jamming position at the other end of its associated cam surface, said supporting means being so constructed and arranged as to alter the tension of said second springs when being moved relatively to said last mentioned part.

14. A free-wheeling mechanism comprising a driving part and a driven part in coaxial arrangement, a first and a second set of jamming members between said parts, one of said parts having depressed cam surfaces one for each jamming member, a set of first springs and a set of second springs, one first spring and one second spring arranged at opposite sides of each of said jamming members, said first spring being supported by said last mentioned part and tending to move its associated jamming member in one direction of rotation into a jamming position at one end of its associated cam surface, a first and a second set of cam members connected for rotation with said last mentioned part but movable in relation thereto, said second springs being supported by said first and said second cam members respectively and tending to move said second jamming members in the other direction of rotation into a jamming position at the other ends of said cam surfaces, said cam members being so constructed and arranged as to alter the tension of said second springs when being moved relatively to said last mentioned part, means for moving said first set of cam members and means for moving said second cam members relatively to said last mentioned part.

15. A free-wheeling mechanism as claimed in claim 14 in which said cam members are formed as wedges, the first set of wedges having wedge surfaces of an inclination differing from that of the second set.

16. A free-wheeling mechanism as claimed in claim 14 in which said cam members are formed as wedges, said wedges being adapted to be moved each in a direction at right angles to the plane of rotation of the mechanism, the first set of wedges having the same inclination over their entire active length and the second set of wedges having a not inclined portion and an inclined portion of an inclination differing from that of the first set.

17. A free-wheeling mechanism as claimed in claim 14 in which said cam members are formed as wedges, the first set of wedges having an inclination differing from that of the second set, and in which said moving means comprise a sleeve connected for rotation with said part with cam surfaces, and are axially movable in relation thereto, said first and said second wedges being attached to said sleeve.

18. A free-wheeling clutch comprising a driving part and a driven part in coaxial arrangement, at least one jamming member between said parts, said jamming member having a free position and one jamming position in front and one jamming position behind its free position in the direction of rotation, a first resilient means arranged in front and a second resilient means arranged in the rear of said jamming member, one end of each of said resilient means being constantly in operative engagement with said jamming member, a pressure member for the other end of one of said resilient means, said pressure member being rigidly connected to one of said clutch parts, and externally controlled means for altering the tension of the other one of said resilient means.

STEFAN FISCHER.